UNITED STATES PATENT OFFICE.

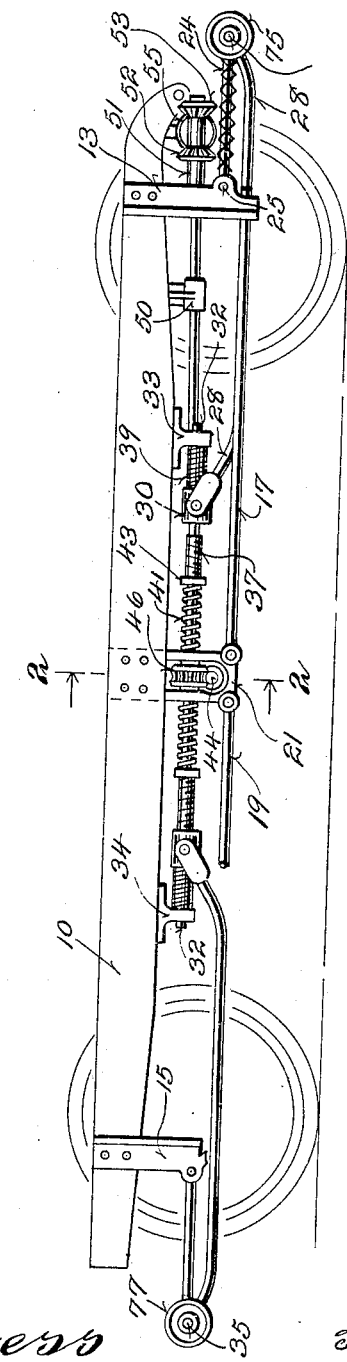

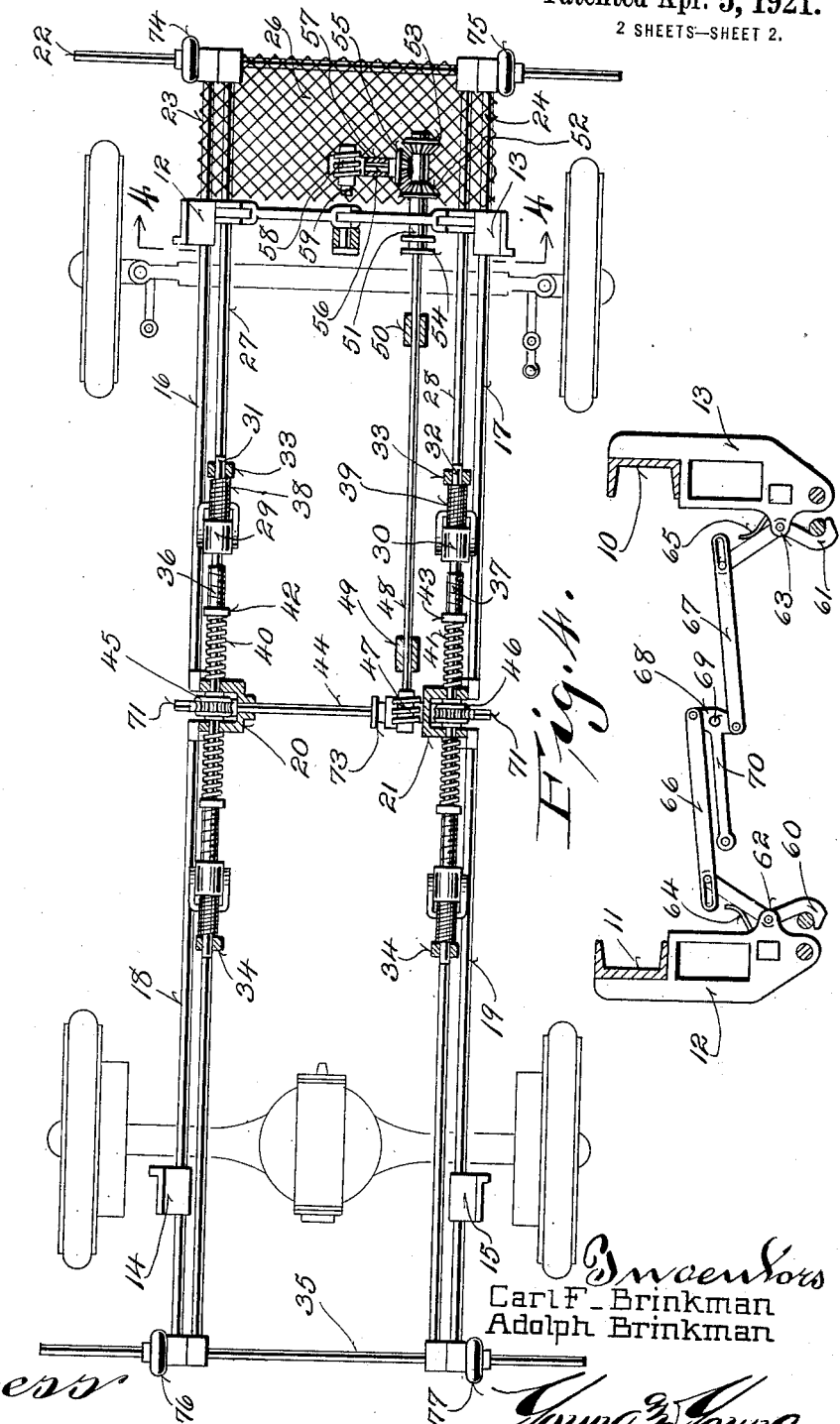

CARL F. BRINKMAN AND ADOLPH BRINKMAN, OF MILWAUKEE, WISCONSIN.

AUTOMATIC JACK FOR VEHICLES.

1,373,549.  Specification of Letters Patent.  Patented Apr. 5, 1921.

Application filed December 6, 1920. Serial No. 428,778.

*To all whom it may concern:*

Be it known that we, CARL F. BRINKMAN and ADOLPH BRINKMAN, citizens of the United States, and residents of Milwaukee, in the county of Milwaukee and State of Wisconsin, have invented certain new and useful Improvements in Automatic Jacks for Vehicles; and we do hereby declare that the following is a full, clear, and exact description thereof.

Our invention relates to an improved automatic jack for vehicles, and is more particularly adapted for use in connection with vehicles which are motor driven.

One of the principal objects of the invention is to provide an attachment which is carried on the vehicle, and which may be used to jack up the wheels and may be operated with power derived from the engine.

A further object of the invention is to provide a device of this kind, which may also be operated manually when desired.

A still further object of the invention is to provide a device of this kind which may also be used as a bumper or safety device, and may also be provided with a baggage carrying attachment.

Other objects and advantages will appear from the following description, in which:

Figure 1 is a side elevation of a vehicle with our invention attached thereto.

Fig. 2 is a vertical cross section on the line 2—2 of Fig. 1.

Fig. 3 is a plan view with parts shown in section, and

Fig. 4 is a vertical cross section on the line 4—4 of Fig. 3.

The vehicle to which our device is applied, comprises the longitudinal channel bars 10 and 11, which are provided near their ends with the depending brackets 12, 13, 14 and 15, which are braced by the longitudinal rods 16, 17, 18 and 19 which extend from the brackets 20 and 21 attached to the channel bars at their center.

The bumper 22 is carried at the forward end of the vehicle by the arms 23 and 24, which are pivoted at 25 to the brackets 12 and 13 respectively. A luggage carrier 26 may be stretched across between the arms 23 and 24, and attached to the bumper. The rods 27 and 28 are pivotally attached at their forward ends to the bumper 22 and are pivoted at their rear ends to the slidable sleeves 29 and 30 respectively. These sleeves are slidably mounted on the rods 31 and 32 which are journaled at one end in the depending bracket 33 and extend through the brackets 20 and 21, and are journaled at their other ends in the depending brackets 34. A bumper 35 may be connected to the rear end of the vehicle and connected in the same manner as the bumper 22.

The sleeves 29 and 30 are acted on by the springs 38 and 39 which abut against the brackets 33. The rods 27 and 28 are held in the position shown in Fig. 1 by latch means which will be hereinafter described. When the latch means is released, the springs act to force the sleeves 29 and 30 which are internally threaded into engagement with the threaded portions 36 and 37 of the rods 31 and 32. As these rods are rotated, the sleeves will be carried toward the abutments 42 and 43, which are held against the ends of the threaded portions by the springs 40 and 41.

As the sleeves are carried toward the other ends of the threaded portions, the bumper will be swung downwardly about its pivot and will eventually be carried underneath its pivot 25, and thereby raise the wheels from the ground. After the sleeves have been carried past the threaded portions they will be held by the springs 40 and 41 in position to engage the threads upon rotation of the rods 31 and 32 in the opposite direction, and will thereby lower the wheels again to the ground and raise the bumper.

The means for rotating the rods 31 and 32 comprises the transverse shaft 44 mounted in the brackets 20 and 21, and connected to said rods by the worm gearings 45 and 46 respectively. The shaft 44 is driven by the worm gearing 47 from the longitudinal shaft 48, which is mounted in the depending brackets 49 and 50, and carries on its forward end a slidable sleeve 51 which carries the reversing gears 52 and 53, either one of which may be engaged with the gear 55 by means of the flanged member 54. The gear 55 is mounted on the shaft 56 carried by the bracket 57 and driven by the worm gearing 58 from the crank shaft 59 of the motor.

The latch means for retaining the bumper in its raised position, comprises the pawls 60 and 61, mounted in the ears 62 and 63 which are carried by the brackets 12 and 13. Pawls are held by the springs 64 and 65 as shown in Fig. 4, and may be actuated to release the bumper through the links 66 and 67 connected to the opposite ends of the cross head 68 which is journaled on the stud 69 and provided with an actuating lever 70. The shaft 44 is provided with an end 71 to which may be attached a hand crank for manual operation when it is desirable to operate the jack manually.

The motor driven means is disconnected by means of the clutch 72 provided with the flanged portion 73 for connecting or disconnecting the same. The bumpers 22 and 35 are provided with rollers 74, 75, 76 and 77 for engaging the ground when the same are being used for jacking up the wheels.

Normally the bumpers are carried in the position shown in Fig. 1, and are held in this position by the latch mechanism illustrated in detail in Fig. 4. It will be noted that the sleeves 29 and 30 are separated by an appreciable distance from the threaded portions 36 and 37. When the latch mechanism is released, therefore, the bumpers will immediately drop to a point near the ground and will act as a safety device to catch any person who is struck by the bumper.

If it is desired to jack up the wheels, one of the beveled gears 52 or 53 is connected with the beveled gear 55, and with the motor running the rods 31 and 32 will be oppositely rotated to draw the bumper underneath the pivot 25. When it is desired to restore the bumper and to lower the wheels, the gearing 52, 53 and 55 is reversed, and if it is desired to operate the jack manually these gears are left in neutral position, the clutch 72 is released and the crank applied to the end 71 of the shaft 44.

Having thus described our invention we claim:

1. An attachment for motor vehicles comprising a bumper, means for pivotally connecting said bumper to the forward end of a vehicle to project in front of the same, means for swinging said bumper underneath the forward end of the vehicle to jack up the front wheels, and means for operatively connecting said first mentioned means to the crank shaft of the engine.

2. An attachment for motor vehicles comprising a bumper, means for pivotally connecting said bumper to the forward end of a vehicle to project in front of the same, means for swinging said bumper underneath the forward end of the vehicle to jack up the front wheels, means for operatively connecting said first mentioned means to the crank shaft of the engine, and means for manually operating said first mentioned means when desired.

3. An attachment for motor vehicles comprising a bumper, means for pivotally connecting the bumper to the forward end of the vehicle to project in front of the same, a rear bumper similarly connected to the rear end of the vehicle, means for swinging said bumpers underneath the ends of the vehicle to jack up the wheels, and means for operatively connecting said first mentioned means to the crank shaft of the engine.

4. An attachment for motor vehicles comprising a bumper, means for pivotally connecting the bumper to the forward end of the vehicle to project in front of the same, a rear bumper similarly connected to the rear end of the vehicle, means for swinging said bumpers underneath the ends of the vehicle to jack up the wheels, means for operatively connecting said first mentioned means to the crank shaft of the engine, and means for manually operating said first mentioned means when desired.

5. An attachment for motor vehicles comprising a bumper, means for pivotally connecting said bumper to the forward end of the vehicle to project in front of the same, a rear bumper similarly connected to the rear end of the vehicle, means for selectively swinging either of said bumpers underneath the end of the vehicle to jack up the wheels at that end, and means for operatively connecting said first mentioned means to the crank shaft of the engine.

6. An attachment for motor vehicles comprising a bumper, means for pivotally connecting said bumper to the forward end of the vehicle to project in front of the same, a rear bumper similarly connected to the rear end of the vehicle, means for selectively swinging either of said bumpers underneath the end of the vehicle to jack up the wheels at that end, means for operatively connecting said first mentioned means to the crank shaft of the engine, and means for manually operating said first mentioned means when desired.

7. An attachment for motor vehicles comprising a bumper, means for pivotally connecting said bumper to the forward end of the vehicle to project in front of the same, a rear bumper similarly connected to the rear end of the vehicle, means for selectively swinging either of said bumpers underneath the front of the vehicle to jack up the wheels at that end, means for operatively connecting said first mentioned means to the crank shaft of the engine, and a baggage carrier attached to one of said bumpers.

8. In combination with the chassis and wheels of a motor vehicle, brackets depending from one end of the chassis, arms pivotally mounted in said brackets, a bumper carried on the ends of said arms, said arms being of such length that the wheels will be raised from the ground when the arms and bumper are swung underneath their pivot, a latch for holding said bumper outwardly beyond the end of said vehicle, means for stopping said bumper above the ground when said latch is released, means for subsequently moving said bumper underneath said pivot to raise the wheels from the ground, said last named means being operable manually or from the motor as desired.

In testimony that we claim the foregoing we have hereunto set our hands at Milwaukee, in the county of Milwaukee and State of Wisconsin.

CARL F. BRINKMAN.
ADOLPH BRINKMAN.